Patented Jan. 19, 1937

2,068,623

UNITED STATES PATENT OFFICE 2,068,623

COLORED COMPOUND DERIVED FROM YELLOW OXIDATION FERMENT AND METHOD OF PRODUCING SAME

Otto Warburg, Berlin-Dahlem, Germany, assignor to Schering-Kahlbaum A. G., Berlin, Germany No Drawing. Application December 13, 1933, Serial No. 702,200. In Germany December 15, 1932

33 Claims. (Cl. 260—9)

This invention relates to the yellow oxidation ferment and the crystallized colored compound derived therefrom and to methods of obtaining the same.

In the "Biochemische Zeitschrift", volume 254, pages 441–442, a process is described by which a solution containing a ferment capable of transferring oxygen as well as other ferments and cell constituents, is produced.

Now, it has been found that the ferment capable of transferring oxygen can be separated from its accompanying substances by adding to solutions obtained from animal or vegetable cells, sufficient amounts of organic solvents which are miscible with water, such as acetone, methanol, ethanol and the like. Thereby the impurities are precipitated while the yellow oxidation ferment remains in solution. It is precipitated from its solution by the addition of further amounts of said solvents and by reprecipitation from its aqueous solution by means of such solvents, saturating with carbon dioxide and repeated treatment of the aqueous solution of the precipitate with the above mentioned solvents. The precipitate obtained in this manner is a yellow powder and represents the purified oxidation ferment.

It is, of course, possible to use other methods of purifying the ferment after separating it from the greater part of said accompanying substances by precipitation with water-miscible solvents, for instance by concentrating the purified solution at a low temperature and recrystallizing and reprecipitating the ferment by means of water, carbon dioxide or solvents, or in any other suitable manner.

It has furthermore been found that this ferment consists of a colored compound which is combined with a protein. The isolated ferment is readily split up into its components by agents capable of denaturing proteins, but the isolated ferment has the remarkable property of transferring oxygen without being affected by such poisons as hydrocyanic acid or carbon monoxide. This colored compound can be separated from the protein component and isolated in crystallized form. For this purpose the protein is preferably rendered insoluble by means of agents which keep the colored compound in solution. Suitable denaturing solvents are, for instance, methanol, ethanol and other alcohols, acetone and other solvents which are employed alone or preferably in mixture with water. Thereby a protein-free solution of the colored compound, for instance an aqueous or chloroform solution, which exhibits a green fluorescence is obtained. This solution is catalytically inactive; but it exhibits in the visible light an absorption spectrum very similar to that of the original solution of the ferment. The aqueous solution exhibits an absorption spectrum of two visible bands at 445 to 455 $\mu$ and 475 to 485 $\mu$. The colored compound itself is obtained in crystallized form from this protein-free solution by rendering the solution alkaline, e. g. by means of sodium hydroxide, and subsequently exposing it to the light. Thereby the colored compound is rearranged and can be extracted from the acidified aqueous solution by means of chloroform or other not or not completely water-miscible solvents, while the colored compound, before its exposure to the light, can not be extracted from its acidified solution by solvents. The pure, irradiated colored compound is obtained by recrystallization from water in yellow needles. Instead of irradiating the alkaline protein-free solution of the colored compound, the same effect is accomplished by allowing alkaline solutions of the colored compound to stand for a longer period of time, or by heating said solutions.

The yellow colored compound of the oxidation ferment can also be obtained directly from the cell material without previous isolation of the ferment. For this purpose animal or vegetable cells which are preferably washed, dried or comminuted, such as for instance bottom yeast, are treated with solvents or mixtures of solvents which are capable of dissolving the colored compound component of the ferment complex. The extraction of the colored compound is considerably accelerated by adding to the solvents or mixtures of solvents acids or acid salts.

When using acids or acid salts, even water may be used as extracting agent, whereby the temperature is preferably raised in order to obtain a yield as high as possible.

These solutions as obtained directly from vegetable or animal cell matter may be worked up to the pure color compound by the previously described methods.

In order to illustrate the invention, several examples are given without however, limiting said invention to these examples.

*Example 1.*—To an aqueous solution of the ferments and other cell components, obtained according to the method described in "Biochemische Zeitschrift", volume 254, pages 441 to 442, half of its volume of acetone is added and the mixture allowed to stand at 0° C. for 24 hours. The hemochromogene is precipitated and filtered off while the oxidation ferment remains in solution in the filtrate. The latter is further purified by precipitating it by adding more acetone to the solution, separating the precipitate from the mother liquor, redissolving it in water and adding to the aqueous solution half of its volume of acetone at 0° C. The ferment is precipitated as a yellowish-red oil on saturating the water-acetone mixture with carbon dioxide. This oil is isolated and for further purification redissolved in water. On adding methanol at 0° C. to its aqueous solution a bright yellow powder is precipitated which still contains colorless proteins. The aqueous solution of the oxidation ferment obtained by this method exhibits an absorption spectrum having three lines. The visible lines are at 465 and 495 $\mu$.

Example 2.—In order to separate the colored compound from the protein component of the oxidation ferment obtained according to Example 1, the latter is treated at 38° C. with a mixture of 1 volume of water and 3 volumes of methanol. Thereby the protein is denatured while the colored compound is dissolved. After centrifuging the undissolved protein, the protein-free solution of the colored compound which shows a greenish fluorescence, is concentrated by evaporation in vacuo, whereby a yellow powder representing the colored compound of the oxidation ferment is obtained.

Example 3.—In order to convert the colored compound of the yellow oxidation ferment, obtained according to Example 2, in its crystalline modification, the former is dissolved in ½n. sodium hydroxide solution and the solution is exposed to the rays of a metal filament lamp. Thereby the colored compound is rearranged and is transformed into a product which on acidifying can be separated from its aqueous solution by extraction by means of chloroform. The chloroform solution of the colored compound is carefully concentrated whereby the rearranged colored compound precipitates. The colored compound is recrystallized from water and forms bright-yellow needles. It can be sublimated in a high vacuum without decomposition. It melts at 320° C., thereby decomposing.

Example 4.—The solution of the crude colored compound from the yellow oxidation ferment obtained for instance according to Example 2 is adjusted by the addition of alkali so as to correspond to a concentration of $n/2n$ to $n/1$ NaOH, and is allowed to stand for 48 hours After acidifying, the colored compound is extracted from the solution by means of chloroform. On evaporation of the chloroform and recrystallization of the colored compound from water, the latter is obtained in the form of clusters of fine needles.

Instead of allowing the alkaline solution to stand, the rearrangement may be carried out by heating the same for about 2 hours to 50—60° C.

Example 5.—500 grams of bottom yeast (dry yeast) are shaken for 72 hours at 38° C. with a solvent mixture consisting of 1 volume of water and 3 volumes of methanol. Thereby the colored compound is dissolved. This extraction is preferably repeated several times. The filtrates of these extractions are combined and concentrated by evaporation in a vacuum to about 500 cc., the remaining aqueous solution is extracted by means of chloroform, acidified with hydrochloric acid so as to react acid against congo paper, again extracted with chloroform, thereafter rendered alkaline by addition of 10n. sodium hydroxide until its sodium hydroxide concentration corresponds to a $n/2$ solution, and exposed for two hours to the action of a strong metal-filament lamp. The irradiated solution is acidified while cooling with ice and extracted with chloroform. The colored compound passes into the chloroform thereby exhibiting a green fluorescence.

The colored compound may be purified by recrystallization from water.

The extraction is considerably accelerated and completed in one third of the time required otherwise, when adding to the extraction mixture of water and methanol so much hydrochloric acid that the mixture contains about 5% of free acid. These solutions, however, are not as pure as those obtained without the addition of acids.

Instead of aqueous methanol, also aqueous ethanol, or acetone, or aqueous ethanol to which a small amount of organic solvents which are little or not at all miscible with water, such as ether, ethyl acetate, and the like, or other suitable aqueous solvents and solvent mixtures may be added.

Instead of hydrochloric acid, also sulfuric acid, phosphoric acid or acid salts, such as sodium bisulfate or the like may be employed.

Example 6.—10 kilograms of yeast are mixed with 20 liters of a 10% hydrochloric acid in a suitable container until a uniform mass has formed. The mixture is slowly heated to about 30–60° C. and is kept at this temperature for several hours. The entire reaction mass is filtered by suction. The filtrate which exhibits a greenish-yellow color contains the greater part of the yellow colored compound of the oxidation ferment in comparatively pure form. It is recovered therefrom by extraction with chloroform and is purified by recrystallization from water as described in the preceding example.

Example 7.—2 kilograms of yeast are well triturated in a mortar with 4 liters of a 10% trichloro acetic acid solution, until a homogeneous mass is produced, which is allowed to stand for about 10 hours at room temperature. The filtrates obtained by filtering the reaction mass by means of a filter press are worked up to the pure yellow colored compound of the oxidation ferment as described in the preceding examples.

Instead of using yeast as starting material, other vegetable or animal cell matter may be used as source of the yellow oxidation ferment and the colored compound derived therefrom. Other solvents than those given may be employed and various other modifications may be made by those skilled in the art in accordance with the principles set forth herein and in the claims annexed hereto.

What I claim is:—

1. A method of producing the yellow oxidation ferment from animal or vegetable cell matter which contains said ferment which comprises adding to an aqueous solution of said oxidation ferment obtained from said cell matter and containing said ferment and accompanying substances, a solvent for said ferment, maintaining a temperature sufficiently low to avoid splitting of said ferment into the protein and colored components.

2. A method of producing the yellow oxidation ferment from animal or vegetable cell matter which contains said ferment which comprises precipitating from aqueous solutions obtained from said cell matter and containing said ferment and accompanying substances, the latter by the addition of water-miscible organic solvents, maintaining a temperature sufficiently low to substantially prevent splitting of said ferment into the protein and colored components and isolating and purifying said yellow oxidation ferment.

3. A method of producing the yellow oxidation ferment from animal or vegetable cell matter which contains said ferment which comprises precipitating from aqueous solutions obtained from said cell matter and containing said ferment and accompanying substances, the latter by the addition of water-miscible organic solvents, maintaining a temperature sufficiently low to substantially prevent splitting of said ferment into the protein and colored components, removing said accompanying substances, isolating and purifying said ferment by repeated precipitation from its solution.

4. A method of producing the colored component derived from the yellow oxidation ferment from animal or vegetable cell matter which contains said ferment which comprises adding to an aqueous solution of said oxidation ferment obtained from said cell matter and containing said ferment and accompanying substances a solvent for said ferment, treating said ferment with agents capable of rendering insoluble the protein component of said ferment, and separating and isolating the yellow colored compound of the oxidation ferment.

5. A method of producing the colored component derived from the yellow oxidation ferment from animal or vegetable cell matter which contains said ferment which comprises separating said oxidation ferment from aqueous solutions obtained from said cell matter and containing said ferment and accompanying substances, treating said ferment with organic solvents adapted to cause separation of protein from the ferment and capable of dissolving said colored compound, and separating and isolating said yellow colored compound of the oxidation ferment from the obtained solutions.

6. A method of producing the colored component derived from the yellow oxidation ferment from animal or vegetable cell matter which contains said ferment which comprises separating said oxidation ferment from aqueous solutions obtained from said cell matter and containing said ferment and accompanying substances, treating aqueous solutions of said ferment with organic solvents adapted to cause separation of protein from the ferment and capable of dissolving said colored compounds and separating and isolating said yellow colored compound of the oxidation ferment from the obtained solutions.

7. A method of producing the colored component derived from the yellow oxidation ferment from animal or vegetable cell matter which contains said ferment which comprises separating said oxidation ferment from aqueous solutions obtained from said cell matter and containing said ferment and accompanying substances, treating said ferment with agents capable of rendering insoluble the protein component of said ferment, separating and isolating the yellow colored compound of the oxidation ferment, dissolving the latter in alkali hydroxide solution, exposing said solution to the action of light, acidifying said irradiated solution, extracting the yellow colored compound by means of solvents which are little or not at all miscible with water, and isolating said colored compound from its solution in said solvent.

8. A method of producing the colored component derived from the yellow oxidation ferment from animal or vegetable cell matter which contains said ferment which comprises separating said oxidation ferment from aqueous solutions obtained from said cell matter and containing said ferment and accompanying substances, treating aqueous solutions of said ferment with protein-denaturing organic solvents capable of dissolving said colored compound, and separating and isolating said yellow colored compound of the oxidation ferment from the obtained solutions, dissolving said colored compound in alkali hydroxide solution, exposing said solution to the action of light, acidifying said irradiated solution, extracting the yellow colored compound by means of solvents which are little or not at all miscible with water, and isolating said colored compound from its solution in said solvent.

9. A method of producing the colored component derived from the yellow oxidation ferment from animal or vegetable cell matter which contains said ferment which comprises precipitating from aqueous solutions obtained from said cell matter and containing said ferment and accompanying substances, the latter by the addition of water-miscible organic solvents, removing said accompanying substances, isolating and purifying said ferment by repeated precipitation from its solution, treating aqueous solutions of said ferment with protein-denaturing organic solvents capable of dissolving said colored compounds, separating and isolating the yellow colored compound of the oxidation ferment, dissolving the latter in alkali hydroxide solution, exposing said solution to the action of light, acidifying said irradiated solution, extracting the yellow colored compound by means of chloroform and isolating said colored compound from the chloroform solution.

10. A method of producing the colored component derived from the yellow oxidation ferment from animal or vegetable cell matter which contains said ferment which comprises separating said oxidation ferment from aqueous solutions obtained from said cell matter and containing said ferment and accompanying substances, treating said ferment with agents capable of rendering insoluble the protein component of said ferment, separating and isolating the yellow colored compound of the oxidation ferment, dissolving the latter in alkali hydroxide solution, allowing the solution to stand for a longer period of time, acidifying said solution, extracting the yellow colored compound by means of solvents which are little or not at all miscible with water, and isolating said colored compound from its solution in said solvent.

11. A method of producing the colored component derived from the yellow oxidation ferment from animal or vegetable cell matter which contains said ferment which comprises separating said oxidation ferment from aqueous solutions obtained from said cell matter and containing said ferment and accompanying substances, treating said ferment with agents capable of rendering insoluble the protein component of said ferment, separating and isolating the yellow colored compound of the oxidation ferment, dissolving the latter in alkali hydroxide solution, heating said solution, acidifying the same, extracting the yellow colored compound by means of solvents which are little or not at all miscible with water, and isolating said colored compound from its solution in said solvent.

12. A method of producing the colored component derived from the yellow oxidation ferment from animal or vegetable cell matter which contains said ferment which comprises subjecting the cell matter of animal or vegetable origin to the action of solvents which are capable of dissolving the yellow colored compound of the oxidation ferment, maintaining a temperature sufficiently high to cause splitting of said ferment into the protein and colored components, removing the undissolved matter and isolating the colored compound from said solution.

13. A method of producing the colored component derived from the yellow oxidation ferment from animal or vegetable cell matter which contains said ferment which comprises subjecting the cell matter of animal or vegetable origin to the action of solvents which are capable of dissolving the yellow colored compound of the oxidation ferment, maintaining a temperature sufficiently high to cause splitting of said ferment into the protein and colored components, removing the undissolved matter, separating and isolating the yellow colored compound of the oxidation ferment, dissolving the latter in alkali hydroxide solution, exposing said solution to the action of light, acidifying said irradiated solution, extracting the yellow colored compound by means of solvents which are little or not at all miscible with water, and isolating said colored compound from its solution in said solvent.

14. A method of producing the colored component derived from the yellow oxidation ferment from animal or vegetable cell matter which contains said ferment which comprises subjecting the cell matter of animal or vegetable origin to the action of solvents which are capable of dissolving the yellow colored compound of the oxidation ferment, maintaining a temperature sufficiently high to cause splitting of said ferment into the protein and colored components, removing the undissolved matter, separating and isolating the yellow colored compound of the oxidation ferment, dissolving the latter in alkali hydroxide solution, allowing the solution to stand for a longer period of time, acidifying said solution, extracting the yellow colored compound by means of solvents which are little or not at all miscible with water, and isolating said colored compound from its solution in said solvent.

15. A method of producing the colored component derived from the yellow oxidation ferment from animal or vegetable cell matter which contains said ferment which comprises subjecting the cell matter of animal or vegetable origin to the action of solvents which are capable of dissolving the yellow colored compound of the oxidation ferment, maintaining a temperature sufficiently high to cause splitting of said ferment into the protein and colored components, removing the undissolved matter, separating and isolating the yellow colored compound of the oxidation ferment, dissolving the latter in alkali hydroxide solution, heating said solution, acidifying the same, extracting the yellow colored compound by means of solvents which are little or not at all miscible with water, and isolating said colored compound from its solution in said solvent.

16. A method of producing the colored component derived from the yellow oxidation ferment from animal or vegetable cell matter which contains said ferment which comprises subjecting the cell matter of animal or vegetable origin to the action of solvents which are capable of dissolving the yellow colored compound of the oxidation ferment and to which are added compounds of acid reaction, maintaining a temperature sufficiently high to cause splitting of said ferment into the protein and colored components, removing the undissolved matter and isolating the colored compound from said solution.

17. A method of producing the colored component derived from the yellow oxidation ferment from animal or vegetable cell matter which contains said ferment which comprises subjecting the cell matter of animal or vegetable origin to the action of dilute aqueous solutions of compounds of acid reaction under such conditions as to cause splitting of said ferment into the protein and colored components, removing the undissolved matter, and isolating the colored compound from said dilute aqueous solution.

18. A method of producing the colored component derived from the yellow oxidation ferment from animal or vegetable cell matter which contains said ferment which comprises subjecting the cell matter of animal or vegetable origin to the action of dilute aqueous solutions of compounds of acid reaction at an elevated temperature so as to cause splitting of said ferment into the protein and colored components, removing the undissolved matter, and isolating the colored compound from said dilute aqueous solution.

19. The yellow oxidation ferment obtained from animal or vegetable cell matter, and which may be obtained by adding to solutions obtained from such cells sufficient amounts of organic solvents miscible with water to precipitate impurities, the aqueous solution of the same exhibiting an absorption spectrum of three bands, the visible bands of said spectrum being at 465 $\mu$ and 495 $\mu$.

20. The crystalline yellow colored compound of the oxidation ferment, which may be obtained by treating the yellow oxidation ferment derived from cells with solvents which render the protein of said ferment insoluble, and which melts at 320° C. whereby decomposition takes place, said colored compound being soluble in chloroform and water.

21. A method of producing the yellow oxidation ferment derived from animal or vegetable cell matter which contains said ferment which comprises adding to an aqueous solution of said ferment an organic solvent for said ferment, while maintaining the temperature of the solution substantially below normal room temperature.

22. A method of producing the yellow oxidation ferment derived from animal or vegetable cell matter which contains said ferment which comprises adding to an aqueous solution of said ferment an organic solvent for said ferment, while maintaining the temperature of the solution substantially below normal room temperature by artificially cooling said solution.

23. A method of producing the yellow oxidation ferment derived from animal or vegetable cell matter which contains said ferment which comprises adding to an aqueous solution of said ferment an organic solvent for said ferment, while maintaining the temperature of the solution at about 0° C.

24. A method of producing the yellow oxidation ferment derived from animal or vegetable cell matter which contains said ferment which comprises adding to an aqueous solution of said ferment an organic solvent for said ferment, while maintaining the temperature of the solution substantially below normal room temperature, filtering off the precipitate and recovering the solution.

25. A method of producing the yellow oxidation ferment derived from animal or vegetable cell matter which contains said ferment which comprises adding to an aqueous solution of said ferment an organic solvent for said ferment, while maintaining the temperature of the solution substantially below normal room temperature, filtering off the precipitate, treating the solution to precipitate said ferment and recovering the same.

26. A method of producing the yellow oxidation ferment derived from animal or vegetable cell matter which contains said ferment which comprises adding to an aqueous solution of said ferment an organic solvent for said ferment, while maintaining the temperature of the solution substantially below normal room temperature, filtering off the precipitate, treating the solution at a temperature substantially below normal room temperature to precipitate said ferment and recovering the same.

27. A method of producing the yellow oxidation ferment derived from animal or vegetable cell matter which contains said ferment which comprises adding to an aqueous solution of said ferment an organic solvent for said ferment, while maintaining the temperature of the solution at about 0° C., filtering off the precipitate, treating the solution at about 0° C. to precipitate said ferment and recovering the same.

28. A method of producing the yellow oxidation ferment derived from animal or vegetable cell matter which contains said ferment which comprises adding to an aqueous solution of said ferment an organic solvent for said ferment in an amount sufficient only to cause precipitation of hemochromogene, while maintaining the temperature of the solution substantially below normal room temperature.

29. A method of producing the yellow oxidation ferment derived from animal or vegetable cell matter which contains said ferment which comprises adding to an aqueous solution of said ferment approximately one half its volume of acetone, while maintaining the temperature of the solution substantially below atmospheric.

30. A method of producing the yellow oxidation ferment derived from animal or vegetable cell matter which contains said ferment which comprises adding to an aqueous solution of said ferment approximately one half its volume of acetone, while maintaining the temperature of the solution substantially below atmospheric, filtering off the hemochromogene, and adding acetone to the solution to cause precipitation of said ferment, while maintaining said temperature.

31. A method of producing the yellow oxidation ferment derived from animal or vegetable cell matter which contains said ferment which comprises adding to an aqueous solution of said ferment approximately one half its volume of acetone, while maintaining the temperature of the solution substantially below atmospheric, filtering off the hemochromogene, and adding acetone to the solution to cause precipitation of said ferment, while maintaining said temperature, then redissolving and reprecipitating said ferment.

32. The yellow oxidation ferment obtained from animal or vegetable cell matter, said ferment consisting of a high molecular weight protein component and a low molecular weight colored component and being very readily split up into these components by a treatment with agents capable of denaturing proteins, the oxygen transferring capacity of solutions of said ferment not being diminished or hindered by hydrocyanic acid or carbon monoxide, the aqueous solution of the same exhibiting an absorption spectrum of three bands, the visible bands of said spectrum being at 465 $\mu$ and 495 $\mu$.

33. The crystalline yellow colored compound of the oxidation ferment which melts at 320° C. whereby decomposition takes place, the aqueous solution of the same exhibiting an absorption spectrum of two visible bands at 445 to 455 $\mu$ and 475 to 485 $\mu$, its solution in water and chloroform showing a greenish fluorescence.

OTTO WARBURG.